US012709157B1

(12) United States Patent
Jacob et al.

(10) Patent No.: US 12,709,157 B1
(45) Date of Patent: Aug. 18, 2026

(54) PROJECTOR-BASED BLINDSPOT/DISTRACTION MITIGATION

(71) Applicant: United Services Automobile Association (USAA), San Antonio, TX (US)

(72) Inventors: Rincy Rose Jacob, Garland, TX (US); Carlos JP Chavez, San Antonio, TX (US); Christopher Alan Crawford, Keller, TX (US); Seth E. Ethington, Prosper, TX (US); Evan William Eldridge Gallagher, San Antonio, TX (US); Ryan Juichi Wakabayashi, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/903,760

(22) Filed: Oct. 1, 2024

(51) Int. Cl.
*B60K 35/28* (2024.01)
*G06V 10/70* (2022.01)
*G06V 20/59* (2022.01)

(52) U.S. Cl.
CPC .............. *B60K 35/28* (2024.01); *G06V 10/70* (2022.01); *G06V 20/59* (2022.01); *B60K 2360/178* (2024.01); *B60K 2360/1868* (2024.01); *B60K 2360/334* (2024.01); *B60K 2360/785* (2024.01); *B60K 2360/788* (2024.01)

(58) Field of Classification Search
CPC .............. B60K 35/28; B60K 2360/178; B60K 2360/1868; B60K 2360/334; B60K 2360/785; B60K 2360/788; G06V 10/70; G06V 20/59
See application file for complete search history.

(56) References Cited

U.S. PATENT DOCUMENTS

| | | | | |
|---|---|---|---|---|
| 9,126,533 | B2 * | 9/2015 | Kubota | H04N 7/183 |
| 2009/0086019 | A1 * | 4/2009 | Okabe | B60R 1/25 348/118 |
| 2016/0182823 | A1 * | 6/2016 | Murasumi | B60R 1/28 348/38 |
| 2017/0061689 | A1 * | 3/2017 | Petrany | H04N 7/18 |
| 2018/0172993 | A1 * | 6/2018 | Nill | B60K 35/23 |
| 2018/0334101 | A1 * | 11/2018 | Tschirhart | B60R 1/26 |

* cited by examiner

*Primary Examiner* — Daryl C Pope
(74) *Attorney, Agent, or Firm* — Fletcher Yoder, P.C.

(57) ABSTRACT

Systems and methods are provided for using a mitigation system to mitigate effects caused by blind spots and various distractions to a user inside a vehicle. In particular, the present disclosure relates to systems and methods for projecting images obtained by cameras on projection areas of the vehicle to provide notifications for the user. The mitigation system receives image data from the cameras and processes the image data to enhance the identification of an object, reduce image distortions when projected on the projection areas, reduce distractions in the image, and so on. The mitigation system processes the image data obtained by the camera based on relevant data obtained from a variety of data sources. The mitigation system sends the processed image data to projectors to project on the projection areas.

20 Claims, 3 Drawing Sheets

PROJECTOR-BASED BLINDSPOT/DISTRACTION MITIGATION

BACKGROUND

The present disclosure relates generally to systems and methods for providing effective notifications. In particular, the present disclosure relates to systems and methods for providing projector-based blind spot/distraction mitigation for vehicles.

Generally, a blind spot is an obscuration of the visual field. When a user is inside a vehicle, a portion of the user's visual field may be blocked or distracted, e.g., by a part of the vehicle (e.g., pillar beams, doors, ceiling, or by objects around the vehicle (e.g., people, vehicles, billboards, traffic light poles), or due to weather (e.g., precipitation, fog, thunderstorm) or poor light condition (e.g. night time). For example, pillar beams of the vehicle may block a portion of the user's visual field, and objects located or appeared behind the pillar beams may not be noticed by the user. These blind spots or distractions may prevent the user from noticing the circumstances around the vehicle, which might cause safety concerns. In addition, it may be difficult to see a particular object (e.g., pedestrians, gas station, building entrance) under certain environments or weather. Accordingly, it may be desired to mitigate the effects caused by the blind spots and distractions. In addition, it may be desirable to identify a particular object and make it more noticeable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more cameras, one or more projectors, and a computing system including one or more processors. The one or more processors may be configured to: receive an enable signal to enable projecting an image on a projection area of a vehicle using the one or more projectors; in response to receiving the enable signal, process image data received from the one or more cameras to generate processed image data; and send the processed image data to the one or more projectors for projecting the image on the projection area.

In one embodiment, a method may include: receiving an enable signal to enable projecting an image on a projection area of a vehicle using one or more projectors; in response to receiving the enable signal, processing image data received from one or more cameras to generate processed image data; and sending the processed image data to the one or more projectors for projecting the image on the projection area.

In one embodiment, a tangible, non-transitory, computer readable storage media may include instructions for one or more processors to perform operations. The operations may include: receiving an enable signal to enable projecting an image on a projection area of a vehicle using one or more projectors; in response to receiving the enable signal, processing image data received from one or more cameras to generate processed image data; and sending the processed image data to the one or more projectors for projecting the image on the projection area.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
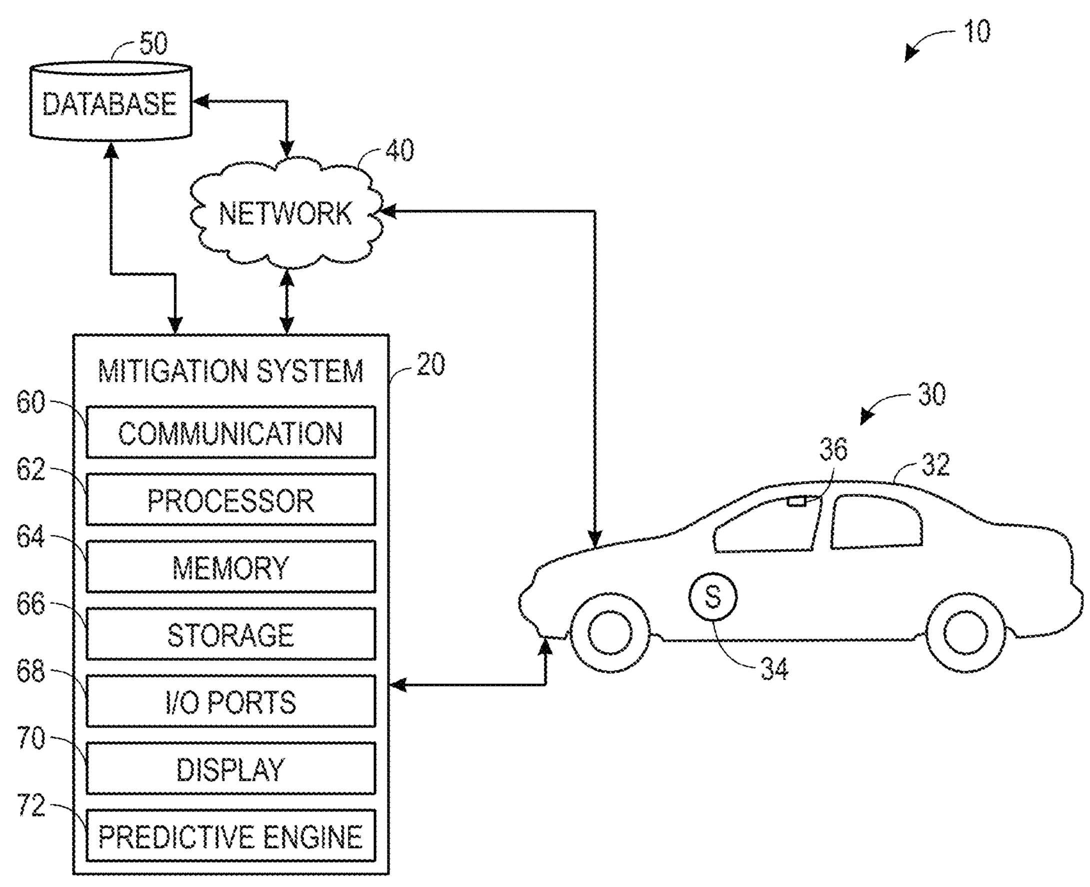
FIG. 1 is a diagram of a system that includes a mitigation system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

As discussed above, when a user is inside a vehicle, a portion of the user's visual field may be blocked or distracted, e.g., by a part of the vehicle (e.g., pillar beams, doors, ceiling, or by objects around the vehicle (e.g., people, vehicles, billboards, traffic light poles), or due to weather (e.g., precipitation, fog, thunderstorm) or poor light condition (e.g. night time). These blind spots or distractions may prevent the user from noticing circumstances occurring around the vehicle, which might cause safety concerns. In addition, it may be difficult to see a particular object (e.g., pedestrians, gas station, building entrance) under certain environment or weather. As such, it may be beneficial to provide systems and methods for mitigating the effects caused by the blind spots and distractions.

With this in mind, the embodiments described herein may include systems and methods for mitigating effects caused by blind spots and various distractions to a user inside a vehicle. The vehicle may include cameras (e.g., an infrared (IR) camera, visible-light camera, an ultraviolet (UV) camera, a thermal camera, a night vision camera), which may be used to monitor real-time operating situation and environment, both inside and outside, of the vehicle. The mitigation system may receive image data from the cameras, and the image data may include information of the real-time environment of the vehicle. For instance, the mitigation system may be turned on by receiving a signal from the user, or the mitigation system may be triggered based on an operational condition (e.g., of the vehicle and/or the mitigation system), such as the vehicle changing driving direction and/or driving environment (e.g., which may cause the average ambient light intensity within a threshold distance range outside of the vehicle is less than a threshold light intensity value).

The image data may be used to identify presentation data to a vehicle operator. However, in some situations, the image data received by the mitigation system may include an unidentified object, which may be unidentified, for example, due to weather, poor light condition, the object being partially blocked (e.g., by a part of the vehicle or by objects around the vehicle), issues associated with the cameras, etc. The mitigation system may utilize one or more machine learning models to predict the properties (e.g., pedestrian, gas station, building entrance) of the object based on the image data and/or other information associated with the object and/or environment of the object and/or vehicle. For example, the mitigation system may receive relevant data (e.g., weather data, environment data, social event data, location sensor (e.g., Global Positioning System (GPS)) data), which may be used to predict the properties of the object. For example, the mitigation system may receive location sensor data indicating a location of the vehicle, geographic map data around the location of the vehicle, weather data of the location of the vehicle, social event data of the location of the vehicle, and the like. The mitigation system may obtain characteristics (e.g., shape, color, size, location) of the object from the relevant data and/or the image data. The mitigation system may predict the properties of the object based on the characteristics of the object. The mitigation system may process the image data based on the predicted properties of the object so that the object may be identified in the image data, which may be used to identify the presentation data to provide to the vehicle operator.

In some embodiments, the presentation data may include a projection of the image data (e.g., the objects and/or environment captured on the other side of a blind spot) that is projected to one or more projection areas (e.g., surface of pillar beams, windshield) of the vehicle. The one or more projection areas may be specifically selected based upon correspondence to particular image data. For example, an image projection of objects and/or environment obstructed from view of a vehicle operator by a particular pillar of the vehicle may be projected on a projection area of the particular pillar. This in some instances may provide the illusion that the pillar is not present, but masking substantially all of the pillar with a projection of what is occurring behind the pillar.

In some embodiments, a projection area of the vehicle may include a non-flat surface, which may cause distortion in the images projected on it. For example, a surface of a pillar beam may be non-flat, which may cause distortion to the images projected on it. It may be beneficial to reduce the distortion of the images projected on the projection area, which may help the user to identify the object or the properties of the object (e.g., shape, size, location). The mitigation system may process the image data based on the characteristics (e.g., curvature, shape, size) of the projection area to reduce the distortion of the images when the images are projected on the projection area. For example, the mitigation system may use various image processing techniques to process the image data, such as image warping, image enhancement, and the like. The characteristics of the projection area relevant to projection adaptations on the projection area may, in some embodiments, be pre-programmed into the mitigation system based upon known manufacturing specifications. In other embodiments, a sensor system, such as a Lidar system and/or image capture system may be used to identify relevant characteristics of the projection area.

In some embodiments, the mitigation system may use various image processing techniques to make an object (e.g., people) more identifiable on the projection area, such as image filtering, image enhancement, image segmentation, image restoration, and the like. In some embodiments, the mitigation system may add visual effects and/or indications (e.g., flashing, outline, highlight, an augmented reality content) to the image of the object projected on the projection area to make it more noticeable. In some embodiments, the mitigation system may use the various image processing techniques to make an object (e.g., billboard) and/or an effect (e.g., precipitation) less identifiable on the projection area to reduce distractions for the user. In some embodiments, image stretching and/or squeezing may be implemented, such as to cause correct proportions to project on a curved and/or otherwise unproportionable surface.

In some embodiments, the mitigation system may adjust the projection (e.g., location, size) of the image data based on a type of the vehicle. For example, a school bus may have a particular configuration that may generate relatively large blind spots, and a customized projection may be used. Further, as may be appreciated, there may be particular objects of interest with respect to particular types of vehicles, which may be more sensitively identified and result in more sensitive alerting/mitigation. For example, with a school bus or an ice cream truck, children may be more likely to gravitate to these types of vehicles. Thus, the context of this expectation may "pre-warm" onboard systems to look for, identify, and alert/mitigate based upon these expected objects.

By way of introduction, FIG. 1 illustrates a diagram of a system 10 that may include a mitigation system 20 communicating with a vehicle system 30 of a vehicle 32. The vehicle 32 may include a variety of cameras 34 (e.g., an infrared (IR) camera, visible-light camera, an ultraviolet (UV) camera, a thermal camera, a night vision camera) disposed in in various locations of the vehicle 32 (e.g., inside the vehicle 32, outside of the vehicle 32). The cameras 34 may be used to monitor environments and operations of the vehicle 32. In some embodiments, the cameras 34 may also be disposed on devices carried or worn by individuals in the vehicle 32. For example, the cameras 34 may be disposed on mobile phones, wearable electronics, and the like. In one embodiment, the cameras 34 may provide location information regarding the cameras 34. As such, the cameras 34 may provide global positioning system (GPS) coordinates, vehicle-relational position (e.g., position with respect to vehicle 32) and the like to indicate a location of the cameras 34. In certain embodiments, the cameras 34 may include a video system (e.g., image and audio sensors that collect image and audio data), which may capture real-time area data (e.g., vehicle traffic in the area, pedestrian traffic in the area, weather conditions). In some embodiments, the video system may include an image sensor or any suitable camera to capture real-time image data.

The vehicle 32 may include one or more projectors 36 (e.g., a small laser projector, an ultra short throw projector) to project images on one or more projection areas (e.g., pillar beams, windshield, windows) of the vehicle 32. In some embodiments, the images may be processed and/or projection screens (e.g., an ultra short throw projector screen) may be used at these projection areas to mitigate the blind spots and/or distractions in the user's visual field. In some embodiments, a flexible ultra thin LED screen disposed in the projection area may be used in lieu of the corresponding projector. As mentioned previously, a visual field of a user in the vehicle 32 may be blocked or distracted by one or more parts of the vehicle 32 (e.g., pillar beams, doors, ceiling), and/or by objects around the vehicle 32 (e.g., people, vehicles, billboards, traffic light poles), and/or poor visibility due to weather condition (e.g., precipitation, fog, thunderstorm) or light condition (e.g. night time). Such obstructions or conditions may cause one or more blind spots and/or distractions in the user's visual field. The blind spots and/or distractions may prevent the user from noticing the environment around the vehicle 32, resulting in potential safety issues associated with the vehicle 32 and the user. The mitigation system 20 may receive the image data obtained by the camera 34 and send to the projectors 36 for projecting on the projection areas to mitigate the blind spots and/or distractions in the user's visual field.

In some embodiments, the cameras 34 and projectors 36 may be disposed within the vehicle 32 to account for specific known blind spots in the vehicle 32. For example, a pillar may be disposed between a driver seat and the outside of the vehicle 32, blocking visual perception of the outside of the vehicle 32. The projector 36 may be placed in line with the driver seat and pillar and the camera 32 may also be placed in this line, but beyond and/or outward facing from the pillar. Thus, the camera 32 may capture the "other side" of the pillar, while the projector 36 may project to a surface at or near the obfuscating object (e.g., the pillar).

In some embodiments, the mitigation system 20 may process the image data obtained by the camera 34 before sending the image data to the projectors 36 to enhance the identification of an object, reduce image distortions when projected on the projection areas, or reduce distractions in the image, and the like. In some embodiments, the mitigation system 20 may process the image data obtained by the camera 34 based on relevant data obtained from a variety of data sources. As illustrated in FIG. 1, the system 10 may include a network 40 that may be used to obtain relevant data from a variety of data sources and transmit the relevant data to the mitigation system 20. For example, the network 40 may receive data regarding operations, location, and other properties related to the vehicle 32 from the vehicle system 30. The mitigation system 20 may communicate with the vehicle system 30 to collect image data of the cameras 34 directly or via the network 40. The mitigation system 20 may also receive relevant data from a database 50 of the system 10. For example, the database 50 may track or receive information related to area data (e.g., regarding traffic), social event data (e.g., text-based social media posts, pictures, videos of weather events), news (e.g., weather, social events), and the like. For instance, the data from the database 50 may include information regarding a natural phenomenon or other situation and may be related with the image data acquired from the cameras 34. For example, the database 50 may include information provided by various news services that may be updated in real-time or near real time via the network 40. The database 50 may provide information regarding weather alerts, natural phenomenon alerts, non-natural phenomenon alerts (e.g., traffic), and any other information that may be published via an electronic news outlet such as a webpage, news database, or the like. In some embodiments, the database 50 may include information associated with the individuals, businesses, organizations, governmental agencies, news outlets, and the like.

FIG. 1 shows a block diagram of example components that may be part of the mitigation system 20. Although the following description details some example components that make up the mitigation system 20, it should be understood that the mitigation system 20 may include additional or fewer components. As illustrated in FIG. 1, the mitigation system 20 may include a communication component 60, a processor 62, a memory 64, a storage 66, input/output (I/O) ports 68, a display 70, a predictive engine 72, and the like. The communication component 60 may be a wireless or wired communication component that may facilitate communication between the mitigation system 20, the network 40, the database 50, and the like. Additionally, the communication component 60 may facilitate data transfer to the mitigation system 20, such that the mitigation system 20 may receive data from the other components depicted in FIG. 1 (e.g., the vehicle system 30, the cameras 34, the projector 36). The communication component 60 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 62 may include single-threaded processor(s), multi-threaded processor(s), or both. The processor 62 may process instructions stored in the memory 64. The processor 62 may also include hardware-based processor(s) each including one or more cores. The processor 62 may include general purpose processor(s), special purpose processor(s), or both. For example, the processor 62 may include neural processors or artificial intelligence (AI) accelerators designed to accelerate performance of AI tasks. The AI tasks may include generative visual AI for image and video generation, 2D/3D animations, 2D/3D holography, and so on. In some embodiments, the processor 62 may include one or more GPUs for delivering rendering performance needed by demanding visual applications. The processor 62 may be communicatively coupled to other internal components (such as the communication component 60, the storage 66, the I/O ports 68, and the display 70).

The memory 64 and the storage 66 may be any suitable articles of manufacture that can serve as media to store processor-executable code (e.g., artificial intelligence and/or machine learning algorithms), data (e.g., sensor data from the cameras 34, user's behavior data including user's real-time and historical driving records, other relevant data including traffic data, weather data, and social event data), models (e.g., pre-trained models), or the like. These articles of manufacture may represent computer-readable media (e.g., any suitable form of memory or storage) that may store the processor-executable code used by the processor 62 to perform the presently disclosed techniques. As used herein, applications may include any suitable computer software or program that may be installed onto the mitigation system 20 and executed by the processor 62. The memory 64 and the storage 66 may represent non-transitory computer-readable media (e.g., any suitable form of memory or storage) that may store the processor-executable code used by the processor 62 to perform various techniques described herein. It should be noted that non-transitory merely indicates that the media is tangible and not a signal.

The I/O ports 68 may be interfaces that may couple to other peripheral components such as input devices (e.g., keyboard, mouse), sensors, input/output (I/O) modules, and the like. The display 70 may operate as a human machine interface (HMI) to depict visualizations associated with software or executable code being processed by the processor 62. The display 70 may operate to depict a representation of 2D/3D augmented reality (AR) or virtual reality (VR) visualizations associated with software or executable code being processed by the processor 62. In some embodiments, the display 70 may be a touch display capable of receiving inputs from an operator of the mitigation system 20. The display 70 may be any suitable type of display, such as a liquid crystal display (LCD), plasma display, or an organic light emitting diode (OLED) display, for example. Additionally, or alternatively, the display 70 may be provided in conjunction with a touch-sensitive mechanism (e.g., a touch screen) that may function as part of a control interface for the mitigation system 20.

The predictive engine 72 may utilize one or more predictive models for analysis of data received by the mitigation system 20. Various types of the predictive models may be used to analyze data from variety of resources and generate the predictive outputs. The predictive models may be constructed using various artificial intelligence and/or or machine learning algorithms stored in the memory 64 and the storage 66. For example, the predictive engine 72 may be trained with supervised machine learning techniques, i.e., a predictive model is trained with training data that includes input data and desired predictive output (e.g., labeled dataset). The predictive engine 72 may also be trained with unsupervised machine learning techniques, i.e., a predictive model is trained with training data that includes input data but without desired predictive output (e.g., unlabeled dataset). The predictive engine 72 may generate predictive outputs by using the predictive models.

The mitigation system 20 may utilize the predictive engine 72 to generate predicted image data (e.g., for unidentified object) based on the image data obtained by the cameras 34 and/or relevant data received from variety of data sources (e.g., the network 40, the database 50). The predicted image data may be transmitted to the projector 36 and/or other output devices via the communication component 60. The projector 36 and/or the other output devices may project the predicted image data on the projection areas of the vehicle 32 together with the image data received form the cameras 34, thereby generating an augmented reality. As described above, the augmented reality may enhance the user's visual field and allow the user to notice circumstances around the vehicle 32. For example, the augmented reality may fill certain gaps associated with blocked scenes, reduce distractions of undesired scenes-noise caused by objects around the vehicle 32, alert user's ongoing perception of the real-world environment, facilitate the user to identify certain objects and/or points of interests, improve the user's view under certain conditions (e.g., poor visibility due to weather condition and/or light condition, correct image distortions), provide effective alert notifications in various formats (e.g., visual, auditory, haptic, somatosensory), and so on.

It should be noted that the components described above with regard to the mitigation system 20 are exemplary components and the mitigation system 20 may include additional or fewer components as shown. In addition, although the components are described as being part of the mitigation system 20, the components may also be part of any suitable computing device described herein, such as the vehicle system 30, electronic devices (e.g., cloud computing devices in the network 40), and the like to perform the various operations described herein.

Figure 2:
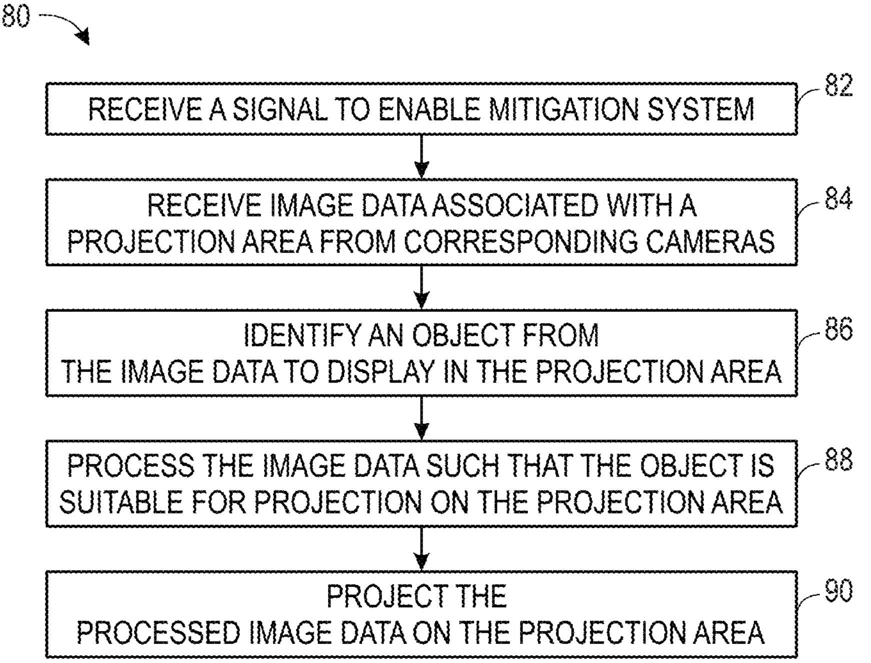
FIG. 2 is a flowchart of a method for using the mitigation system of FIG. 1, in accordance with aspects of the present disclosure.

Keeping this in mind, FIG. 2 illustrates a flowchart of a method 80 for implementing the mitigation system 20. At block 82, the mitigation system 20 may receive an enable signal. For instance, the mitigation system may receive a signal from the user, or a trigger signal generated based on a condition of the operating situation of the vehicle 32 (e.g., the vehicle is turned on, the vehicle is changing driving direction, and/or the vehicle experiences environmental changes (e.g., the average ambient light intensity in a range outside of the vehicle is less than a threshold), etc.).

At block 84, the mitigation system may receive image data associated with the projection area from corresponding cameras 34. The image data may include information of a projection area on which images may be projected, which may, in some cases, be an indication of a particular camera 34 capturing the image data, which may be used with positional information of the particular camera 34. By way of example, when the vehicle is changing direction, image data from the cameras 34 associated with a camera 32 beyond a pillar beam may be useful to facilitate a projection to the pillar beam, enabling the user to identify certain objects and/or points of interests, improve the user's view under certain conditions (e.g., poor visibility due to weather condition and/or light condition), correct image distortions, provide effective alert notifications, and so on via the pillar beam.

In some embodiments, the image data received by the mitigation system 20 may include an unidentified object, which may be unidentified due to weather, poor light conditions, the object being partially blocked (e.g., by a part of the vehicle or by objects around the vehicle), or issues associated with the cameras. Accordingly, at block 86, the mitigation system 20 may utilize one or more machine learning models to predict the properties (e.g., pedestrian, gas station, building entrance) of the object based on the image data and/or other information associated with the environment of the vehicle. For example, the mitigation system 20 may receive relevant data (e.g., weather data, environment data, social event data, location sensor (e.g., Global Positioning System (GPS)) data) via the network 40 or from the data base 50, which may be used to predict the properties of the object. The mitigation system 20 may obtain characteristics (e.g., shape, color, size, location) of the object from the relevant data and/or the image data. The mitigation system 20 may predict the properties of the object based on the characteristics of the object by using the predictive engine 72. The mitigation system 20 may generate predicted image data based on the predicted properties of the object so that the object may be identified in the predicted image data.

At block 88, the mitigation system 20 may process the image data obtained by the camera 34 before sending the image data to the projectors 36 to enhance the identification of an object, reduce image distortions when projected on the projection areas, reduce distractions in the image, and the like. For example, the mitigation system 20 may add visual effects and/or indications (e.g., flashing, outline, highlight, an augmented reality content) to the image of the object. In some embodiments, the mitigation system 20 may process the image data obtained by the camera 34 based on relevant data obtained from a variety of data sources, such as the network 40, the database 50, and so on. For example, the mitigation system 20 may add certain visual effects and/or indications to the image of the object under certain weather (e.g., precipitation, fog, thunderstorm) or poor light condition (e.g. night time). The mitigation system 20 may use various image processing techniques to process the image data. At block 90, the mitigations system 20 may send the processed image data to the projectors 32 for projecting on the projection area.

Although the example described in FIG. 2 is described in a particular order, it should be noted that the example method may be performed in any suitable order and is not limited to the order presented herein. It should also be noted that although each processing block is described above in the example method as being performed by the mitigation system 20, other suitable systems may perform the methods described herein.

Figure 3A:
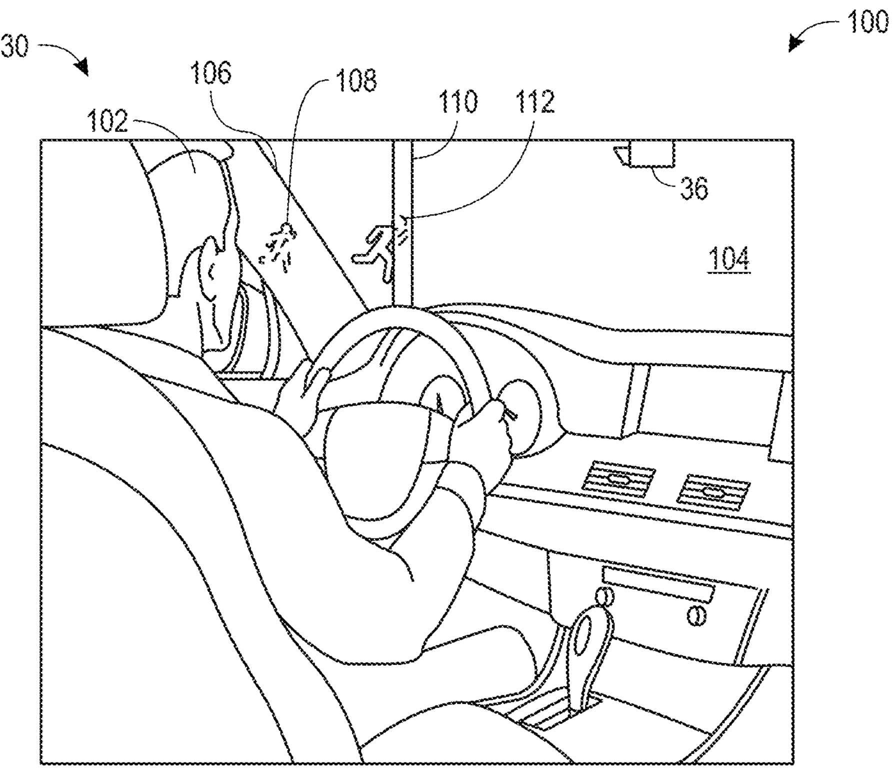
FIG. 3A is a schematic diagram illustrating implementation of the mitigation system of FIG. 1 when a projector is turned off, in accordance with aspects of the present disclosure.

With the preceding in mind, FIG. 3A is a schematic diagram 100 illustrating an embodiment when the mitigation system 20 is turned off. As illustrated in FIG. 3A, a user 102 may operate the vehicle 32, which may include one or more windows 104 (e.g., a wind shield, a door window). The vehicle 32 may include one or more pillar beams 106, which may be used to couple the windows 104 to the vehicle 32. In some embodiments, the pillar beams 106 may block a view of the user 102 so that an object 108 (e.g., a pedestrian) may not be noticeable to the user 102. In some embodiments, an object 110 (e.g., people, billboards, vehicles, traffic light poles) outside the vehicle 32 may block a part of an object 112 (e.g., a pedestrian, an entrance of a point of interest) so that the object 112 may be partially noticeable on a window 104. Accordingly, the user 102 may not recognize or identify the object 112 based on the partial view on the window 104.

Figure 3B:
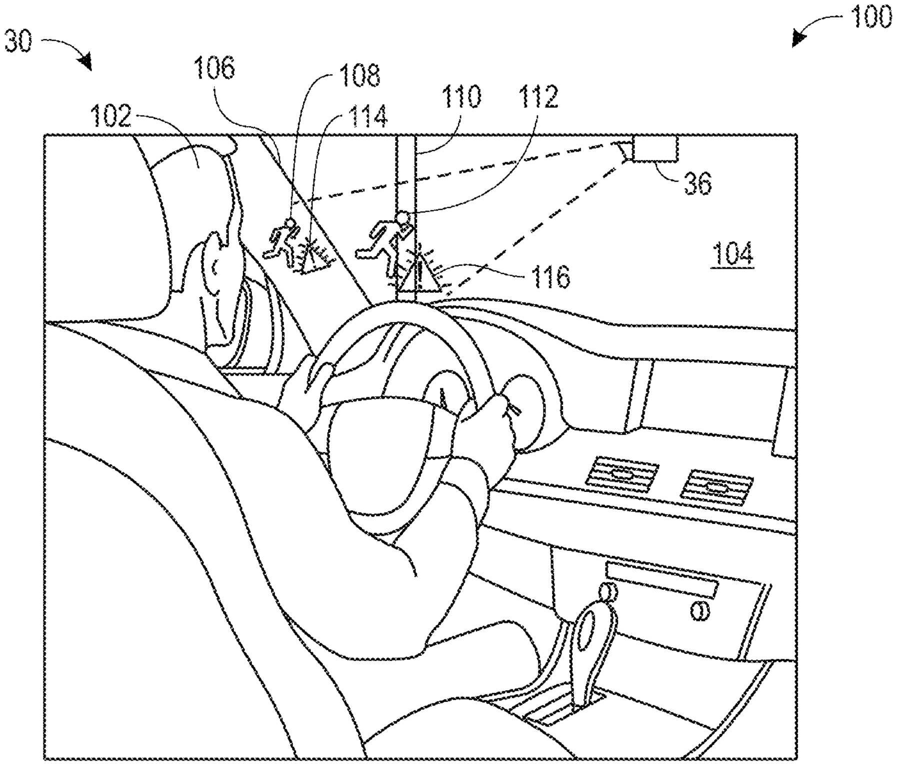
FIG. 3B is a schematic diagram illustrating implementation of the mitigation system of FIG. 1 when the projector is turned on, in accordance with aspects of the present disclosure.

FIG. 3B is a schematic diagram 200 illustrating an implementation of the mitigation system 20 of FIG. 1 when the mitigation system 20 is turned on. As illustrated in FIG. 3B, the mitigation system 20 may receive images of the object 108 from corresponding camera 34 and send to the projector 36 to project the images on a surface of the pillar beams 106. The user 102 may notice the object 108 on the surface of the pillar beams 106. In some embodiments, the mitigation system 20 may add visual effects and/or indications 114 (e.g., flashing, outline, highlight, an augmented reality content) to the image of the object 108 on the surface of the pillar beams 106 to make it more noticeable. The mitigation system 20 may process the image data obtained by the camera 34 before sending the image data to the projectors 36 to project on the surface of the pillar beam. The mitigation system may process the image data to enhance the identification of the object 108, reduce image distortions when projected on the surface of the pillar beam 106 (e.g., by introducing squeezing or stretching to the projected image to adapt the projected image to the curvature of the pillar beam 106), reduce distractions (e.g., by removing a distracting billboard) in the image, and the like. In some embodiments, the mitigation system 20 may process the image data obtained by the camera 34 based on relevant data obtained from a variety of data sources (e.g., the network 40, the database 50).

In FIG. 3B, the mitigation system 20 may predict properties of the object 112 based on image data obtained by the camera 34 and relevant data obtained from a variety of data sources (e.g., the network 40, the database 50). For example, the mitigation system 20 may predict the part of the object 112 that is blocked by the object 110 via the predictive engine 72 based on the image data obtained by the camera 34. The projectors 36 may project the predicted properties of the object 112 on the window 104 so that the user 102 may identify the object 112. In some embodiments, the mitigation system 20 may add visual effects and/or indications 116 (e.g., flashing, outline, highlight, an augmented reality content) to the image of the object 112 on the window 104 to make it more noticeable. The mitigation system 20 may process the image data obtained by the camera 34 before sending the image data to the projectors 36 to project on the window 104. The mitigation system 20 may process the image data to enhance the identification of the object 112, reduce distractions in the image (e.g., by highlighting the object 112), and the like.

Figure 4:
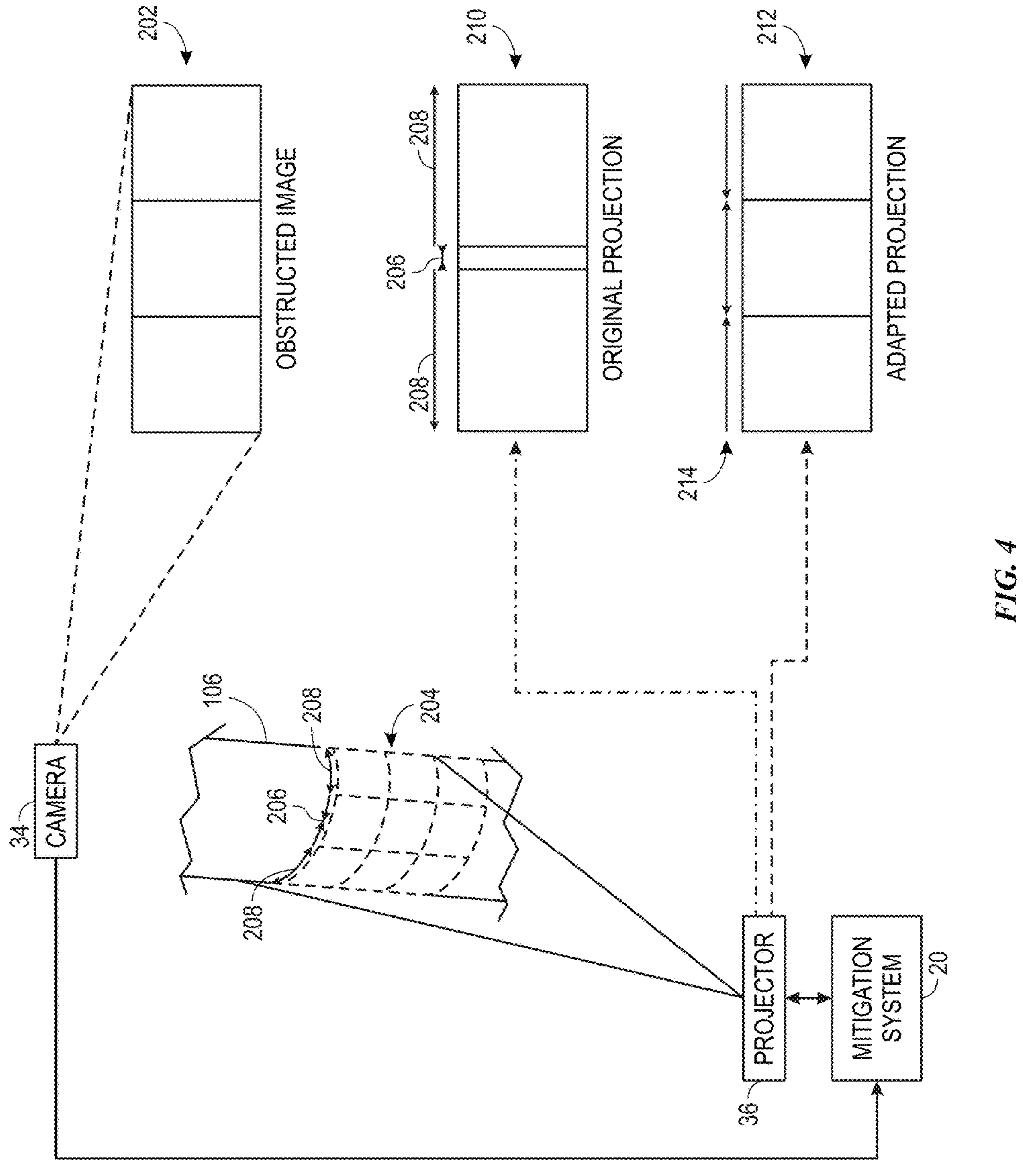
FIG. 4 is a schematic diagram illustrating image manipulation for presentation on a non-flat surface, such as a vehicle pillar, in accordance with aspects of the present disclosure.

FIG. 4 illustrates an example of image processing performed by the mitigation system 20 to properly display a projection of an obstructed image 202 on a non-linear projection surface 204 (e.g., pillar 106). As illustrated, the unique curvature of the non-liner projection surface 204 may cause projected images to appear squeezed and/or stretched (e.g., as indicated by arrows 206 and 208, respectively). Indeed, as illustrated in original projection 210, the projection of the obstructed image appears stretched at the ends and squeezed in the center, which may be caused by the non-linear projection surface 204 shape. Accordingly, the mitigation system 20 may alter the projection to cancel out these presentation artifacts caused by the non-linear shape of the non-linear projection surface 204. To do this, the mitigation system 20 may identify a shape of the non-linear projection surface 204 (e.g., such as by: generating a 3D model via LIDAR measurements of the non-linear projection surface, receiving dimension details (e.g., from a manufacturer of the non-linear projection surface 204), etc.). The mitigation system may apply the identified shape to a projection model that predicts an estimated magnitude of stretching and/or squeezing that will be identified at particular areas of the non-linear projection surface 204. Based upon these predicted magnitudes, the mitigation system 20 may apply offsetting adaptations (e.g., reverse stretching and/or squeezing as indicated on adapted projection 212 by arrows 214) to the projected image, to attempt to mitigate at least a portion of these artifacts. Thus, in lieu of the original projection 210, an adapted projection 212 with reduced projection artifacts may be projected on to the non-linear projection surface 204.

While only certain features of the embodiments described herein have been illustrated and described herein, many modifications and changes will occur to those skilled in the art. It is, therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
- one or more cameras;
- one or more projectors; and
- a computing system, comprising one or more processors configured to:
  - receive an enable signal to enable projecting an image on a projection area of a vehicle using the one or more projectors;
  - in response to receiving the enable signal, process image data received from the one or more cameras to generate processed image data, by:
    - identifying a curvature of the projection area;
    - predicting an offsetting adaptation to offset a projection artifact of the projection area due to the curvature; and
    - generating the processed image data using the offsetting adaptation; and
  - send the processed image data to the one or more projectors for projecting the image on the projection area.

2. The system of claim 1, wherein the projection area comprises a pillar beam of the vehicle.

3. The system of claim 1, wherein the projection area comprises a window of the vehicle.

4. The system of claim 1, wherein the one or more cameras comprise a camera coupled to a mobile device.

5. The system of claim 1, the one or more cameras comprise a camera coupled to the vehicle.

6. The system of claim 1, wherein the processed image data is generated by using one or more machine learning models.

7. The system of claim 1, wherein the processed image data is generated based on relative data, and wherein the relative data is associated with at least one of a location of the vehicle, weather, social event, or news.

8. The system of claim 1, wherein the processed image data comprises object data not included in the image data received from the one or more cameras.

9. The system of claim 1, wherein the processed image data comprises a visual indication for an object projecting on the projection area.

10. A method comprising:
- receiving an enable signal to enable projecting an image on a projection area of a vehicle using one or more projectors;
- in response to receiving the enable signal, processing image data received from one or more cameras to generate processed image data, by:
  - identifying a curvature of the projection area;
  - predicting an offsetting adaptation to offset a projection artifact of the projection area due to the curvature; and
  - generating the processed image data using the offsetting adaptation; and
- sending the processed image data to the one or more projectors for projecting the image on the projection area.

11. The method of claim 10, wherein the projection area comprises a pillar beam of the vehicle.

12. The method of claim 10, wherein the processing image data comprises using one or more machine learning models to generate the processed image data.

13. The method of claim 10, wherein the processing image data comprises generating the processed image data based on relative data, and wherein the relative data is associated with at least one of a location of the vehicle, weather, social event, or news.

14. A tangible, non-transitory computer readable storage media storing instructions that, when executed by one or more processors, cause the one or more processors to perform operations comprising:
- receiving an enable signal to enable projecting an image on a projection area of a vehicle using one or more projectors;

in response to receiving the enable signal, processing image data received from one or more cameras to generate processed image data, by:

identifying a curvature of the projection area;

predicting an offsetting adaptation to offset a projection artifact of the projection area due to the curvature; and generating the processed image data using the offsetting adaptation; and sending the processed image data to the one or more projectors for projecting the image on the projection area.

15. The non-transitory computer readable storage media of claim 14, wherein the projection area comprises a pillar beam of the vehicle.

16. The system of claim 8, wherein the object data is predicted for a portion of an object in an environment of the vehicle, wherein the portion of the object is not captured by the one or more cameras.

17. The system of claim 16, wherein the object data is predicted based on another portion of the object that is captured by the one or more cameras.

18. The method of claim 10, wherein the processed image data comprises object data predicted for a portion of an object in an environment of the vehicle, wherein the portion of the object is not captured by the one or more cameras.

19. The method of claim 18, wherein the object data is predicted based on another portion of the object that is captured by the one or more cameras.

20. The non-transitory computer readable storage media of claim 14, wherein the processed image data comprises object data predicted for a portion of an object in an environment of the vehicle, wherein the portion of the object is not captured by the one or more cameras.

* * * * *